United States Patent
Kunz et al.

(10) Patent No.: US 11,470,094 B2
(45) Date of Patent: Oct. 11, 2022

(54) BI-DIRECTIONAL CONTENT REPLICATION LOGIC FOR ENTERPRISE THREAT DETECTION

(71) Applicant: SAP SE, Walldorf (DE)

(72) Inventors: Thomas Kunz, Lobenfeld (DE); Omar-Alexander Al-Hujaj, Bad Schönborn (DE); Jens Baumgart, Dossenheim (DE); Harish Mehta, Wiesenbach (DE); Florian Chrosziel, St. Leon-Rot. (DE); Marco Rodeck, Maikammer (DE); Thorsten Menke, Bad Iburg (DE)

(73) Assignee: SAP SE, Walldorf (DE)

( * ) Notice: Subject to any disclaimer, the term of this patent is extended or adjusted under 35 U.S.C. 154(b) by 624 days.

(21) Appl. No.: 15/381,567

(22) Filed: Dec. 16, 2016

(65) Prior Publication Data
US 2018/0176234 A1   Jun. 21, 2018

(51) Int. Cl.
*H04L 9/40* (2022.01)
*G06F 16/27* (2019.01)

(52) U.S. Cl.
CPC ......... *H04L 63/1416* (2013.01); *G06F 16/27* (2019.01); *H04L 63/1425* (2013.01)

(58) Field of Classification Search
CPC ............. H04L 63/1416; H04L 63/1425; G06F 17/30569; G06F 17/30575; G06F 16/27
See application file for complete search history.

(56) References Cited

U.S. PATENT DOCUMENTS

| | | |
|---|---|---|
| 5,440,726 A | 8/1995 | Fuchs |
| 5,960,170 A | 9/1999 | Chen |
| 6,173,418 B1 | 1/2001 | Fujino et al. |
| 6,629,106 B1 | 9/2003 | Narayanaswamy |
| 6,779,001 B1 | 8/2004 | Kanai et al. |
| 7,376,969 B1 | 5/2008 | Njemanze |
| 7,380,205 B2 | 5/2008 | Bezrukov et al. |
| 7,441,197 B2 | 10/2008 | Tschiegg et al. |
| 7,457,792 B2 | 11/2008 | Weigt et al. |
| 7,457,793 B2 | 11/2008 | Weigt et al. |
| 7,457,794 B2 | 11/2008 | Weigt et al. |
| 7,545,969 B2 | 6/2009 | Bennett |
| 7,624,092 B2 | 11/2009 | Lieske et al. |
| 7,627,544 B2 | 12/2009 | Chkodrov |
| 7,756,808 B2 | 7/2010 | Weigt et al. |
| 7,756,809 B2 | 7/2010 | Weigt et al. |
| 7,761,396 B2 | 7/2010 | Weigt et al. |

(Continued)

OTHER PUBLICATIONS

Office Action in related U.S. Appl. No. 15/216,201 dated Mar. 7, 2018; 14 pages.

(Continued)

*Primary Examiner* — Jeffrey D. Popham
(74) *Attorney, Agent, or Firm* — Fish & Richardson P.C.

(57) ABSTRACT

A content replication connector receives control data associated with replication of content data from a source system. Based on the control data, the content replication connector fetches the content data from the source system, converts the content data from a first data format to a second data format, and sends the content data to a content replication server. The content replication server replicates the content data, and a target system fetches the content data from the content replication server.

20 Claims, 5 Drawing Sheets

(56) References Cited

U.S. PATENT DOCUMENTS

| | | |
|---|---|---|
| 7,783,723 B2 | 8/2010 | Peng et al. |
| 7,788,718 B1 | 8/2010 | Fei |
| 7,872,982 B2 | 1/2011 | Atkins |
| 7,908,660 B2 | 3/2011 | Bahl |
| 7,934,257 B1 | 4/2011 | Kienzle |
| 7,961,633 B2 | 6/2011 | Shankar |
| 7,971,209 B2 | 6/2011 | Eberlein et al. |
| 8,051,034 B2 | 11/2011 | Mehta et al. |
| 8,091,117 B2 | 1/2012 | Williams |
| 8,474,047 B2 | 6/2013 | Adelstein |
| 8,484,726 B1 | 7/2013 | Sutton |
| 8,554,907 B1 | 10/2013 | Chen et al. |
| 8,661,103 B2 | 2/2014 | Mehta et al. |
| 8,775,671 B2 | 7/2014 | Rodeck et al. |
| 8,892,454 B2 | 11/2014 | Rabetge et al. |
| 8,954,602 B2 | 2/2015 | Seifert et al. |
| 8,973,147 B2 | 3/2015 | Pearcy |
| 9,037,678 B2 | 5/2015 | Mehta et al. |
| 9,075,633 B2 | 7/2015 | Nos |
| 9,106,697 B2 | 8/2015 | Capalik et al. |
| 9,116,906 B2 | 8/2015 | Nos et al. |
| 9,148,488 B2 | 9/2015 | Rabetge et al. |
| 9,170,951 B1 | 10/2015 | He |
| 9,251,011 B2 | 2/2016 | Meier et al. |
| 9,262,519 B1 | 2/2016 | Saurabh |
| 9,304,978 B2 | 4/2016 | Bezrukov et al. |
| 9,313,421 B2 | 4/2016 | Deshpande |
| 9,336,385 B1 | 5/2016 | Spencer |
| 9,348,665 B2 | 5/2016 | Storz et al. |
| 9,383,934 B1 | 7/2016 | Likacs |
| 9,419,989 B2 | 8/2016 | Harris |
| 9,524,389 B1 | 12/2016 | Roth |
| 9,619,984 B2 | 4/2017 | Donovan |
| 9,690,931 B1 | 6/2017 | Anantharaju et al. |
| 9,779,147 B1 | 10/2017 | Sherman et al. |
| 9,779,150 B1 | 10/2017 | Sherman |
| 9,843,596 B1 | 12/2017 | Averbuch |
| 9,979,741 B2 | 5/2018 | Fuhrman |
| 10,001,389 B1 | 6/2018 | Das et al. |
| 10,079,842 B1 | 9/2018 | Brandwine et al. |
| 10,102,379 B1 | 10/2018 | Seifert et al. |
| 10,140,447 B2 | 11/2018 | Rahaman et al. |
| 10,148,675 B1 | 12/2018 | Brandwine et al. |
| 2002/0070953 A1 | 6/2002 | Barg |
| 2003/0074471 A1 | 4/2003 | Anderson |
| 2003/0115484 A1 | 6/2003 | Mariconi et al. |
| 2003/0217137 A1 | 11/2003 | Roese |
| 2004/0015481 A1 | 1/2004 | Zinda |
| 2004/0044912 A1 | 3/2004 | Connary |
| 2004/0078490 A1 | 4/2004 | Anderson |
| 2004/0093513 A1 | 5/2004 | Cantrell |
| 2006/0037075 A1 | 2/2006 | Frattura |
| 2006/0059115 A1* | 3/2006 | Gutfleisch ............... G06F 8/51 |
| 2006/0106847 A1 | 5/2006 | Eckardt et al. |
| 2006/0161816 A1 | 7/2006 | Gula et al. |
| 2006/0218140 A1 | 9/2006 | Whitney |
| 2006/0253907 A1 | 11/2006 | McConnell |
| 2007/0067438 A1 | 3/2007 | Goranson et al. |
| 2007/0073519 A1 | 3/2007 | Long |
| 2007/0100905 A1 | 5/2007 | Masters et al. |
| 2007/0115998 A1 | 5/2007 | McEligott |
| 2007/0136437 A1 | 6/2007 | Shankar et al. |
| 2007/0150596 A1 | 6/2007 | Miller et al. |
| 2007/0183389 A1 | 8/2007 | Clee |
| 2007/0186284 A1 | 8/2007 | McConnell |
| 2007/0266387 A1 | 11/2007 | Henmi |
| 2007/0283192 A1 | 12/2007 | Shevchenko |
| 2007/0300296 A1 | 12/2007 | Kudla |
| 2008/0033966 A1 | 2/2008 | Wahl |
| 2008/0034425 A1 | 2/2008 | Overcash et al. |
| 2008/0080384 A1 | 4/2008 | Atkins |
| 2008/0091681 A1 | 4/2008 | Dwivedi |
| 2008/0163085 A1 | 7/2008 | Subbu et al. |
| 2008/0288889 A1 | 11/2008 | Hunt et al. |
| 2008/0295173 A1 | 11/2008 | Tsvetanov |
| 2008/0320552 A1 | 12/2008 | Kumar |
| 2009/0044277 A1 | 2/2009 | Aaron et al. |
| 2009/0049518 A1 | 2/2009 | Roman |
| 2009/0288164 A1 | 11/2009 | Adelstein |
| 2009/0293046 A1 | 11/2009 | Cheriton |
| 2009/0300045 A1 | 12/2009 | Chaudhry et al. |
| 2009/0312026 A1 | 12/2009 | Parameswar |
| 2010/0011031 A1 | 1/2010 | Huang |
| 2010/0114832 A1 | 5/2010 | Lillibridge |
| 2010/0180325 A1 | 7/2010 | Golobay |
| 2011/0098928 A1 | 4/2011 | Hoffman et al. |
| 2011/0213741 A1 | 9/2011 | Shama |
| 2011/0277034 A1 | 11/2011 | Hanson |
| 2011/0320816 A1 | 12/2011 | Yao |
| 2012/0005542 A1 | 1/2012 | Petersen |
| 2012/0158653 A1* | 6/2012 | Shaffer .................. G06F 16/27 707/622 |
| 2012/0167161 A1 | 6/2012 | Kim et al. |
| 2012/0191660 A1 | 7/2012 | Hoog |
| 2012/0210434 A1 | 8/2012 | Curtis et al. |
| 2012/0271748 A1 | 10/2012 | DiSalvo |
| 2012/0271790 A1 | 10/2012 | Lappas et al. |
| 2012/0317078 A1* | 12/2012 | Zhou .................. G06F 17/30575 707/634 |
| 2013/0086023 A1 | 4/2013 | Tsukamoto et al. |
| 2013/0106830 A1 | 5/2013 | de Loera |
| 2013/0198840 A1 | 8/2013 | Drissi et al. |
| 2013/0212709 A1 | 8/2013 | Tucker |
| 2013/0262311 A1 | 10/2013 | Buhrmann |
| 2013/0298243 A1 | 11/2013 | Kumar et al. |
| 2013/0304665 A1 | 11/2013 | Rodeck et al. |
| 2013/0304666 A1 | 11/2013 | Rodeck et al. |
| 2013/0305369 A1 | 11/2013 | Karta |
| 2013/0326079 A1 | 12/2013 | Seifert et al. |
| 2013/0347111 A1 | 12/2013 | Karta |
| 2014/0047413 A1* | 2/2014 | Sheive .................. H04L 65/403 717/110 |
| 2014/0201836 A1 | 7/2014 | Amsler |
| 2014/0223283 A1 | 8/2014 | Hancock |
| 2014/0244623 A1* | 8/2014 | King ..................... H04L 67/42 707/722 |
| 2014/0317681 A1 | 10/2014 | Shende |
| 2015/0007325 A1 | 1/2015 | Eliseev |
| 2015/0067880 A1 | 3/2015 | Ward |
| 2015/0073868 A1 | 3/2015 | Garman |
| 2015/0106867 A1 | 4/2015 | Liang |
| 2015/0143521 A1 | 5/2015 | Eliseev |
| 2015/0154524 A1 | 6/2015 | Borodow |
| 2015/0180891 A1 | 6/2015 | Seward |
| 2015/0215329 A1 | 7/2015 | Singla |
| 2015/0237065 A1 | 8/2015 | Roytman |
| 2015/0264011 A1 | 9/2015 | Liang |
| 2015/0278371 A1 | 10/2015 | Anand |
| 2015/0281278 A1 | 10/2015 | Gooding |
| 2015/0310070 A1 | 10/2015 | Stefik et al. |
| 2015/0319185 A1 | 11/2015 | Kirti |
| 2015/0341389 A1 | 11/2015 | Kurakami |
| 2015/0347751 A1 | 12/2015 | Card et al. |
| 2015/0355957 A1 | 12/2015 | Steiner |
| 2015/0358344 A1 | 12/2015 | Mumcuoglu |
| 2015/0381646 A1 | 12/2015 | Lin |
| 2016/0057166 A1 | 2/2016 | Chesla |
| 2016/0057167 A1 | 2/2016 | Bach et al. |
| 2016/0065594 A1 | 3/2016 | Srivastava et al. |
| 2016/0092535 A1* | 3/2016 | Kuchibhotla ..... G06F 17/30575 707/634 |
| 2016/0127391 A1 | 5/2016 | Kobres |
| 2016/0202893 A1 | 7/2016 | Mustonen et al. |
| 2016/0226905 A1 | 8/2016 | Baikalov et al. |
| 2016/0248798 A1 | 8/2016 | Cabrera et al. |
| 2016/0291982 A1 | 10/2016 | Mizrahi |
| 2016/0292061 A1 | 10/2016 | Marron |
| 2016/0337384 A1 | 11/2016 | Jansson |
| 2016/0359886 A1 | 12/2016 | Yadav et al. |
| 2016/0364315 A1 | 12/2016 | Lee |
| 2016/0364571 A1 | 12/2016 | Lee |
| 2016/0364740 A1 | 12/2016 | Parker |
| 2016/0366174 A1 | 12/2016 | Cherinin |
| 2016/0373476 A1 | 12/2016 | Dell'anno et al. |

(56) References Cited

U.S. PATENT DOCUMENTS

| | | |
|---|---|---|
| 2016/0378978 A1 | 12/2016 | Singla |
| 2016/0381049 A1 | 12/2016 | Lakhani |
| 2017/0004005 A1 | 1/2017 | Elliott |
| 2017/0026400 A1 | 1/2017 | Adams et al. |
| 2017/0031002 A1 | 2/2017 | Newton et al. |
| 2017/0034023 A1 | 2/2017 | Nickolov |
| 2017/0070415 A1 | 3/2017 | Bell et al. |
| 2017/0091008 A1 | 3/2017 | Cherbakov |
| 2017/0093902 A1 | 3/2017 | Roundy et al. |
| 2017/0148060 A1 | 5/2017 | Showers |
| 2017/0169217 A1 | 6/2017 | Rahaman |
| 2017/0251365 A1 | 8/2017 | Burchard |
| 2017/0270006 A1 | 9/2017 | Kankylas |
| 2017/0279837 A1 | 9/2017 | Dasgupta |
| 2017/0287179 A1 | 10/2017 | Tibshirani et al. |
| 2017/0302685 A1 | 10/2017 | Ladnai et al. |
| 2017/0308602 A1* | 10/2017 | Raghunathan ...... G06F 16/2365 |
| 2017/0316026 A1* | 11/2017 | Kanthak ............. G06F 16/1727 |
| 2017/0322993 A1* | 11/2017 | Brodt ................. G06F 16/2358 |
| 2017/0324766 A1 | 11/2017 | Gonzalez |
| 2018/0027002 A1 | 1/2018 | Rodeck et al. |
| 2018/0027010 A1 | 1/2018 | Pritzkau et al. |
| 2018/0059876 A1 | 3/2018 | Peng et al. |
| 2018/0063167 A1 | 3/2018 | Rodeck |
| 2018/0091535 A1 | 3/2018 | Chrosziel |
| 2018/0091536 A1 | 3/2018 | Chrosziel et al. |
| 2018/0157835 A1 | 6/2018 | Nos |
| 2018/0173872 A1 | 6/2018 | Lam et al. |
| 2018/0173873 A1 | 6/2018 | Hassforther et al. |
| 2018/0176235 A1 | 6/2018 | Lam et al. |
| 2018/0176238 A1 | 6/2018 | Nos et al. |
| 2018/0234447 A1 | 8/2018 | Mueen |
| 2019/0005423 A1 | 1/2019 | Pritzkau et al. |
| 2019/0007435 A1 | 1/2019 | Pritzkau et al. |

OTHER PUBLICATIONS

Office Action in related U.S. Appl. No. 15/274,569 dated Apr. 16, 2018; 11 pages.
U.S. Office Action in related U.S. Appl. No. 15/274,693 dated Feb. 11, 2019, 19 pages.
U.S. Office Action in related U.S. Appl. No. 15/370,084 dated Feb. 4, 2019, 16 pages.
U.S. Office Action in related U.S. Appl. No. 15/274,569 dated Mar. 22, 2019, 13 pages.
Schumacher, "An effective way to bring SAP Security Notes under control," Virtual Forge GmbH, Feb. 2017, https://blog.virtualforge.com/en/an-effective-way-to-bring-sap-security-notes-under-control, 4 pages.
U.S. Office Action in related U.S. Appl. No. 15/274,693 dated Jul. 26, 2018, 14 pages.
U.S. Office Action in related U.S. Appl. No. 15/370,084 dated Aug. 27, 2018, 14 pages.
U.S. Office Action in related U.S. Appl. No. 15/383,771 dated Aug. 3, 2018, 12 pages.
U.S. Office Action in related U.S. Appl. No. 15/216,201 dated Jul. 20, 2018, 15 pages.
U.S. Office Action in related U.S. Appl. No. 15/246,053 dated May 21, 2018, 14 pages.
U.S. Office Action in related U.S. Appl. No. 15/246,053 dated Sep. 24, 2018, 14 pages.
U.S. Office Action in related U.S. Appl. No. 15/253,438 dated Sep. 19, 2018, 17 pages.
U.S. Office Action in related U.S. Appl. No. 15/274,569 dated Nov. 14, 2018, 11 pages.
U.S. Office Action in related U.S. Appl. No. 15/380,379 dated Jul. 19, 2018, 9 pages.
U.S. Office Action in related U.S. Appl. No. 15/380,450 dated Aug. 27, 2018, 19 pages.
U.S. Office Action in related U.S. Appl. No. 15/380,450 dated Jan. 23, 2019, 21 pages.
U.S. Office Action in related U.S. Appl. No. 15/380,450 dated Nov. 2, 2018, 19 pages.
U.S. Office Action in related U.S. Appl. No. 15/383,771 dated Jan. 23, 2019, 14 pages.
Non-Final Office Action issued in U.S. Appl. No. 15/216,046 dated Apr. 29, 2019, 23 pages.
Non-Final Office Action issued in U.S. Appl. No. 15/639,863 dated Jun. 24, 2019, 37 pages.
Non-Final Office Action issued in U.S. Appl. No. 15/246,053 dated May 17, 2019, 28 pages.
Office Action issued in U.S. Appl. No. 15/847,478, dated Aug. 6, 2019, 36 pages.
Office Action issued in U.S. Appl. No. 15/216,046 dated Aug. 21, 2019, 23 pages.
U.S. Office Action in related U.S. Appl. No. 15/383,771 dated Jul. 5, 2019, 16 pages.
Final Office Action issued in U.S. Appl. No. 15/383,771 dated Oct. 31, 2019, 23 pages.

* cited by examiner

BI-DIRECTIONAL CONTENT REPLICATION LOGIC FOR ENTERPRISE THREAT DETECTION

BACKGROUND

Enterprise threat detection (ETD) typically collects and stores a large amount or large sets of log data associated with various heterogeneous systems (often referred to as "big data"). The collected log data is usually analyzed using forensic-type data analysis tools to identify suspicious behavior and to allow an appropriate response. Replication logic for ETD typically carries data between different ETD installations and associated database(s). In some ETD implementations, there is a minimal content replication solution implemented for a specific entity named workspace. The implemented solution is a manual adjustment between a customer's development and productive systems (that is, a manual export and import of data between development and productive systems is required). Not only do ETD systems typically not have access to replication services, but replication is often error prone because developers normally perform the replication services themselves.

SUMMARY

The present disclosure describes methods and systems, including computer-implemented methods, computer program products, and computer systems for bi-directional content replication logic for enterprise threat detection (ETD).

In an implementation, a content replication connector receives control data associated with replication of content data from a source system. Based on the control data, the content replication connector fetches the content data from the source system, converts the content data from a first data format to a second data format, and sends the content data to a content replication server. The content replication server replicates the content data, and a target system fetches the content data from the content replication server.

The above-described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/the instructions stored on the non-transitory, computer-readable medium.

The subject matter described in this specification can be implemented in particular implementations so as to realize one or more of the following advantages. First, the described approach reduces manual operations in content replication among ETD systems, increases security and robustness of content replication, and eliminating replication errors. Second, the described approach enables automatic content replication of a large amount of data and increases an ETD user's efficiency. Third, the described approach enables content replication for a large landscape including more than two ETD systems. Other advantages will be apparent to those of ordinary skill in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

The following detailed description describes bi-directional content replication logic for enterprise threat detection (ETD) and is presented to enable any person skilled in the art to make and use the disclosed subject matter in the context of one or more particular implementations. Various modifications to the disclosed implementations will be readily apparent to those of ordinary skill in the art, and described principles may be applied to other implementations and applications without departing from scope of the disclosure. Thus, the present disclosure is not intended to be limited to the described or illustrated implementations, but is to be accorded the widest scope consistent with the principles and features disclosed herein.

ETD typically collects and stores a large amount or large sets of log data associated with various heterogeneous systems (often referred to as "big data"). The collected log data is usually analyzed using forensic-type data analysis tools to identify suspicious behavior and to allow an appropriate response. Replication logic for ETD typically carries data between different ETD installations and associated database(s). In some ETD implementations, there is a minimal content replication solution implemented for a specific entity named workspace. The implemented solution is a manual adjustment between a customer's development and productive systems (that is, a manual export and import of data between development and productive systems is required). Not only do ETD systems typically not have access to replication services, but replication is often error prone because developers normally perform the replication services themselves.

At a high-level, the described approach provides bi-directional content replication for ETD systems using content replication connectors (CRCs) and a content replication server (CRS). Each ETD system is connected to a CRS through a CRC. Data can be replicated and transported from a source ETD system to a target ETD system. At the source side, the source CRC converts data from the data format of the source ETD system to a content replication data format so that the CRS can replicate the data for the target ETD system to access. At the target side, the target CRC converts the data from the content replication data format to the data format of the target ETD system.

Figure 1:
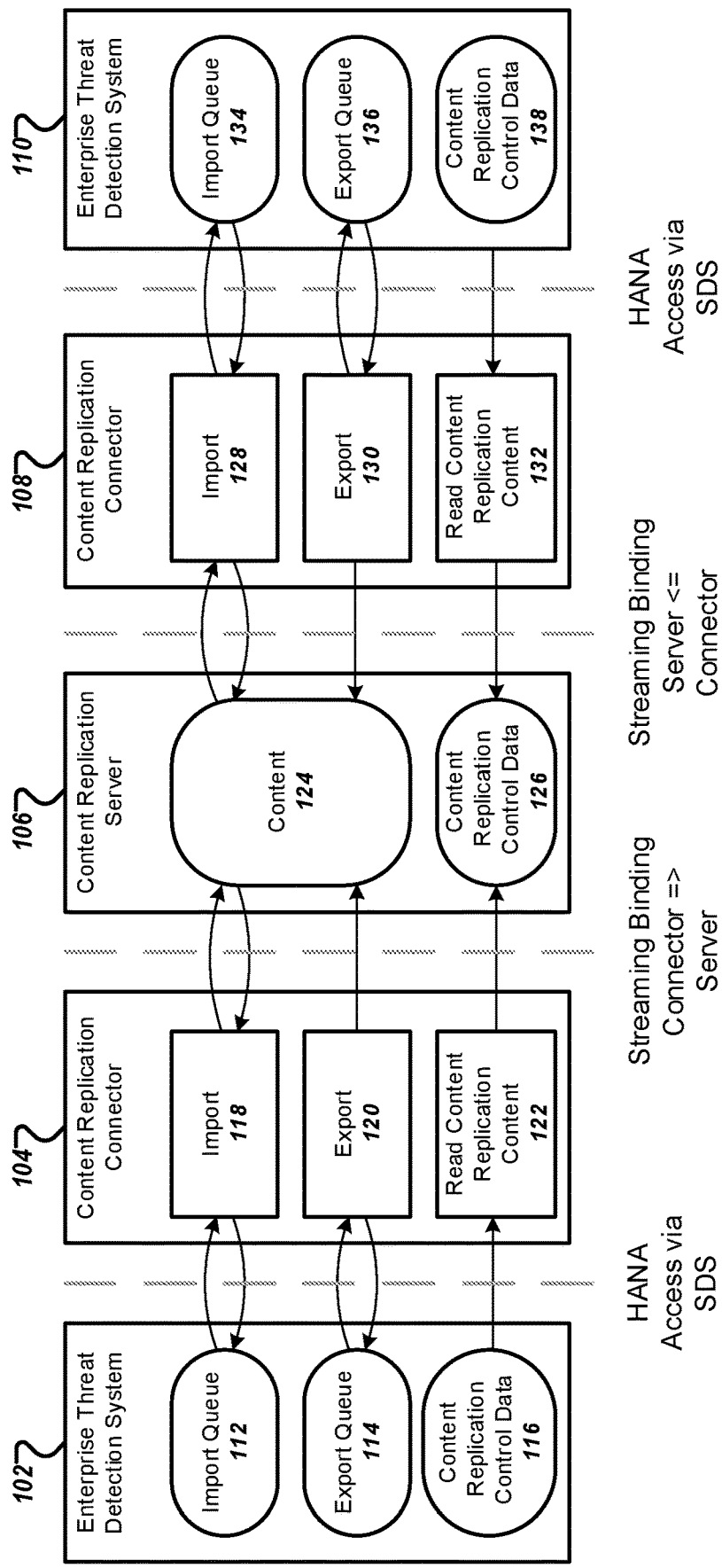
FIG. 1 is a block diagram illustrating a first example system of bi-directional content replication for enterprise threat detection (ETD), according to an implementation.

FIG. 1 is a block diagram illustrating a first example system 100 of bi-directional content replication for ETD, according to an implementation. The example system 100 includes ETD system 102 and 110 connected to a CRS 106 through CRC 104 and 108, respectively. Although FIG. 1 shows two ETD systems connected to the CRS 106, it is understood that more than two ETD systems can be connected to the CRS 106 through CRCs (such as, CRS 104 and 108). In some implementations, an ETD system can be installed on a database system (for example, SAP HANA), and a CRC and a CRS can be on a smart data streaming (SDS) server or cluster associated with the database system. Typically, one SDS cluster includes at least one SDS server.

Typically, as illustrated, the ETD system 102 includes an import queue 112, an export queue 114, and content replication control data 116. Similarly, the ETD system 110 includes an import queue 134, an export queue 136, and content replication control data 138. Typically, as illustrated, the CRC 104 includes an import module 118, an export module 120, and a read content replication content module 122. Similarly, the CRC 108 includes an import module 128, an export module 130, and a read content replication content module 132. Typically, as illustrated, the CRS 106 includes content 124 and content replication control data 126.

In some implementations, the source ETD 102 would like to replicate and transport its content data to the target ETD 110. The content replication control data 116 can specify which content data to replicate and the source and target ETD systems for data transport, or include other information for data replication and transport. The content replication control data 116 can be set or configured by an administrator or automatically generated based on inputs from user interfaces. In some cases, as discussed below, the content data can be context data of the source ETD 102. The source ETD 102 can include the content data to be exported in the export queue 114. The source CRC 104 can fetch the content data in the export queue 114, as well as the content replication control data 116 from the source ETD 102. For example, based on the content replication control data 116, the export module 120 can obtain the content data from the export queue 114. The CRC 104 can also poll the export queue 114 and content replication control data 116 on a regular basis, such as every 30 seconds or some other regular time value. The export module 120 can also perform a data format conversion. For example, the export module 120 can convert the content data from a data format of the source ETD 102 to a content replication data format of the CRS 106. The export module 120 can send the content data to the content 124 in the CRS 106. The read content replication content module 122 can read in the content replication control data 116 and write it to the content replication control data 126 in the CRS 106.

At the target ETD 110, the content replication control data 138 can be the same as the content replication control data 116, which may be set or configured by an administrator or automatically generated based on inputs from user interfaces. The target CRC 108 can fetch the content replication control data 138 from the target ETD 110. For example, the content replication control data 138 can be polled by the CRC 108 on a regular basis, such as every 30 seconds or some other regular time value. The read content replication content module 132 can read in the content replication control data 138 and write it to the content replication control data 126 in the CRS 106. Based on the content replication control data 138, the import module 128 can obtain the content data from the content 124. The import module 128 can also perform a data format conversion. For example, the import module 128 can convert the content data from the content replication data format of the CRS 106 to a data format of the target ETD 110. The import module 128 can send the content data to the import queue 134 so that the target ETD 110 can have the data. Similarly, the ETD 110 can be a source ETD and the ETD 102 can be a target ETD for data transport. Note that the CRS 106 can be a reactive component and does not need to know how many ETD systems it is connected to.

Figure 2:
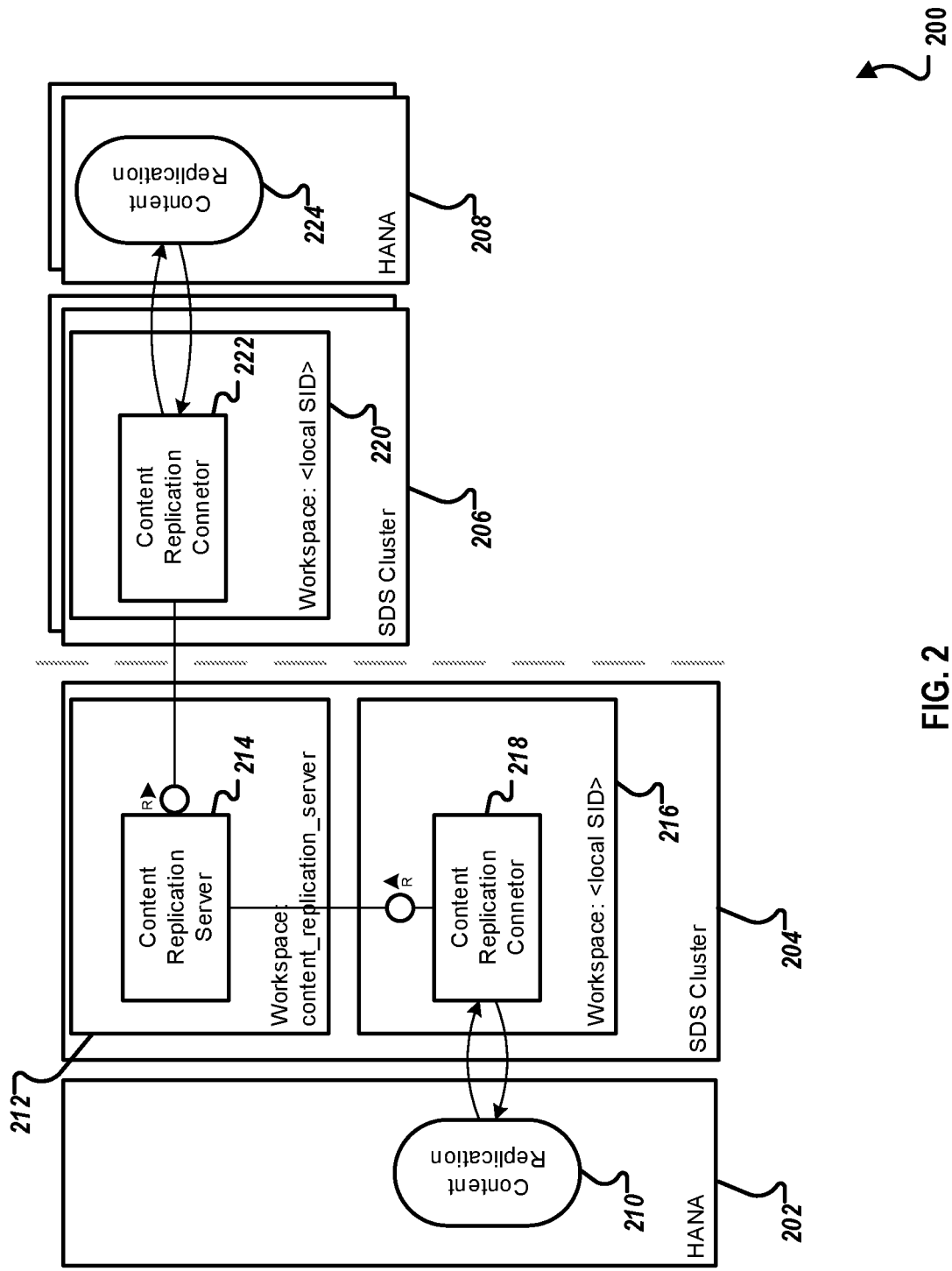
FIG. 2 is a block diagram illustrating a second example system of bi-directional content replication for ETD, according to an implementation.

FIG. 2 is a block diagram illustrating a second example system 200 of bi-directional content replication for ETD, according to an implementation. The example system 200 includes content replication 210 and 224 in database system 202 and 208 (such as SAP HANA) on which ETD systems are installed. The content replication 210 and 224 can include import queue, export queue and content replication control data as described in the ETD 102 and 110 of FIG. 1. Each database system can be associated or connected with an SDS server or cluster. For example, the database system 202 is connected with an SDS server or cluster 204, and the database system 208 is connected with an SDS server or cluster 206. The SDS 204 includes a workspace 216 including a CRC 218 and a workspace 212 including a CRS 214. The SDS 206 includes a workspace 220 including a CRC 222. The CRC 218 and 222 and the CRS 214 can have components as described in FIG. 1. The workspace including a CRC can have a workspace name including the system identifier of the connected database system. For example, the name of the workspace 216 and 220 can include the system identifier of the database system 202 and 208, respectively. In some implementations, multiple ETD systems are connected to one SDS host (SDS server or cluster) and hence multiple CRC instances are deployed on that SDS host. To differentiate the multiple CRC instances on one SDS host, each CRC instance can have its own workspace having a workspace name including the system identifier of the connected database system.

In some implementation, the source ETD system can be a productive ETD system and the target ETD system can be a development and test ETD system, or vice versa. The development and test ETD system is used for content development and testing such as upgrade testing. For the development and test ETD systems to perform content development, proper testing, and secure deployment of developed content, context data from the productive ETD system needs to be replicated in the development and test ETD systems. Similarly, development objects from the development and test ETD systems need to be consistently replicated to the productive ETD system after the content development and testing are finished. For example, a software application can be developed and tested on a development and test ETD system, and loaded to a productive ETD system for customers to use after it is fully developed and tested. When customers have issues with the software application on the productive ETD system, related context and log event data can be sent from the productive ETD system to the development and test ETD system so that developers can recreate the issues on the development and test ETD system and find solutions. Context data can include user context, system context, locations, subnets, workspaces (including patterns), and anomaly patterns, which can also be development objects. When a productive ETD system is the source ETD system and the development and test ETD systems are the target ETD systems, context data of the productive ETD system can be the content data for replication. When the development and test ETD system is the source ETD system and the productive ETD system is the target ETD system, development objects can be the content data for replication.

Figure 3:
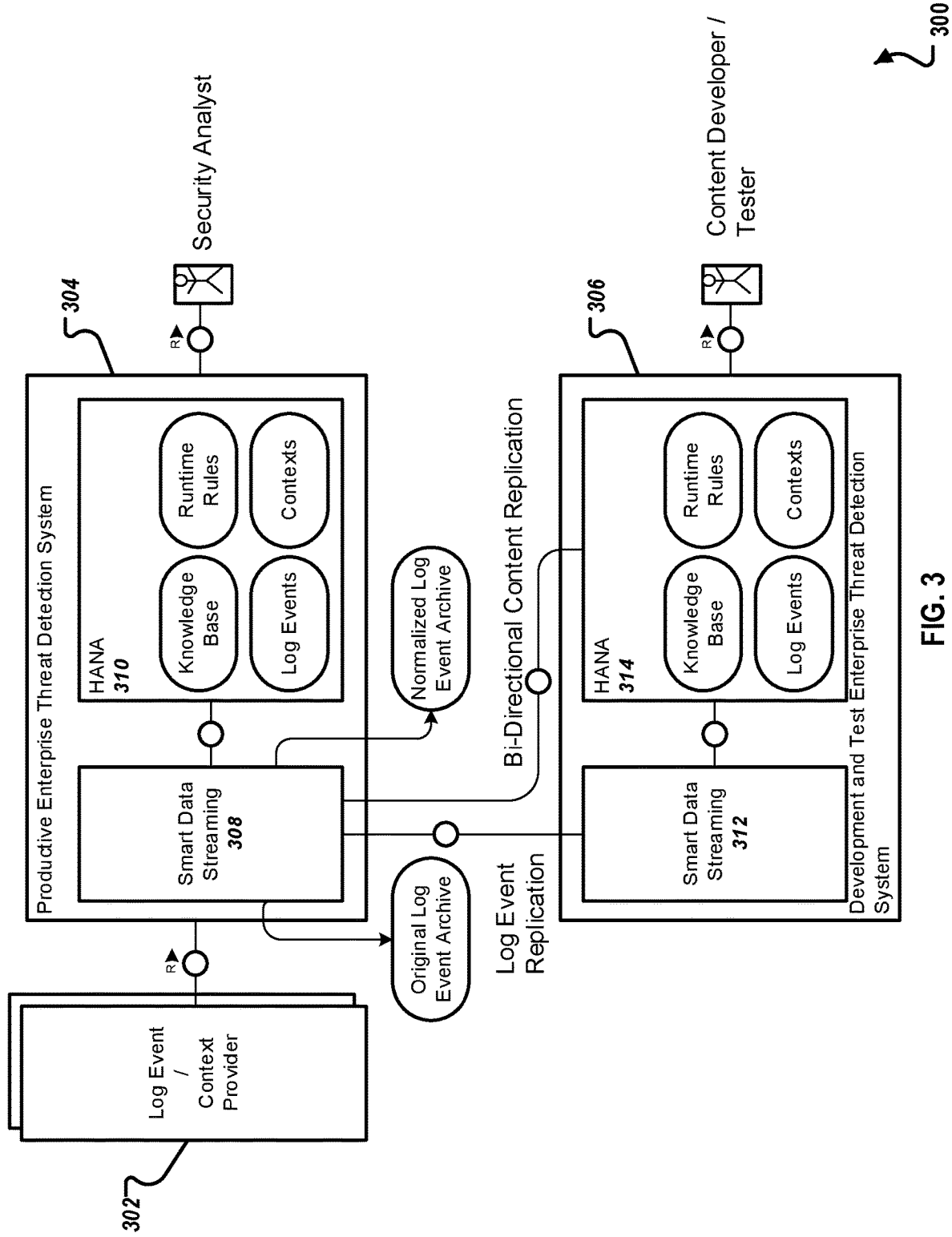
FIG. 3 is a block diagram illustrating a third example system of bi-directional content replication for ETD, according to an implementation.

FIG. 3 is a block diagram illustrating a third example system 300 of bi-directional content replication for ETD, according to an implementation. The example system 300 includes a log event and context provider 302, a productive ETD system 304, and a development and test ETD system 306. The productive ETD system 304 includes a database system 310 (such as SAP HANA) connected to an SDS server 308, and the development and test ETD system 306 includes a database system 314 connected to an SDS server 312. As described in FIG. 2, SDS 308 and 312 can include a CRC, a CRS, or both. The SDS 308 can obtain log event and context data of the productive ETD system 304 from the log event and context provider 302. The log event can include events logged by the productive ETD system 304. The context data can include, for example, location, subnet, system context of the productive ETD system 304. The SDS 308 can replicate the log event and send to the SDS 312. The SDS 308 can also replicate context data of the development and test ETD system 306 and send to the database system 314. Similarly, the development and test ETD system 306 can send development objects to the productive ETD system 304 using the bi-directional content replication. In some implementations, log events are replicated using a dedicated replication (separate from the context data replication) which defines an input binding to the relevant streams in the transfer log event on the productive ETD system 304 and puts the data with an output binding to the relevant streams in the transfer log event running on the SDS server 312 of the development and test ETD system 306. In some implementations, the CRC associated with the development and test ETD system 306 can be deployed on the productive SDS 308 instead of the development SDS 312.

The described approach provides a replication logic that enables a semi-automatic internal update service of an ETD system with user interfaces (UIs) for: value lists (development object (DO)), monitoring page (DO), forensic lab (DO) for workspaces (patterns), system context (context data (CD)), locations (CD), subnet (CD), anomaly patterns (DO), log learning (DO), knowledgebase (DO), and others. These UIs can be used for maintenance of development objects and context data. For example, these UIs can offer functions of selecting objects for replication and exporting the selected objects to the export queue so that the content replication can be performed as controlled with settings made in control data.

The described content replication process can occur in background, automatically creating a transport protocol. The content replication process increases security and robustness of content replication by ensuring traceability with help of the transport protocol. Interdependences are ascertained and necessary content are included in the replication. The process has a definite direction. In some implementations, development objects are semi-automatically transferred, that is, the export and import are triggered manually, but the transfer from the source system to the target systems happens automatically. Context data are automatically transferred. For example, development objects are semi-automatic imported by design decisions made by an administrator so that the administrator is in control when the import of development content into productive system takes place. The import and export of development objects can be controlled and triggered in the content replication UIs as described above.

Figure 4:
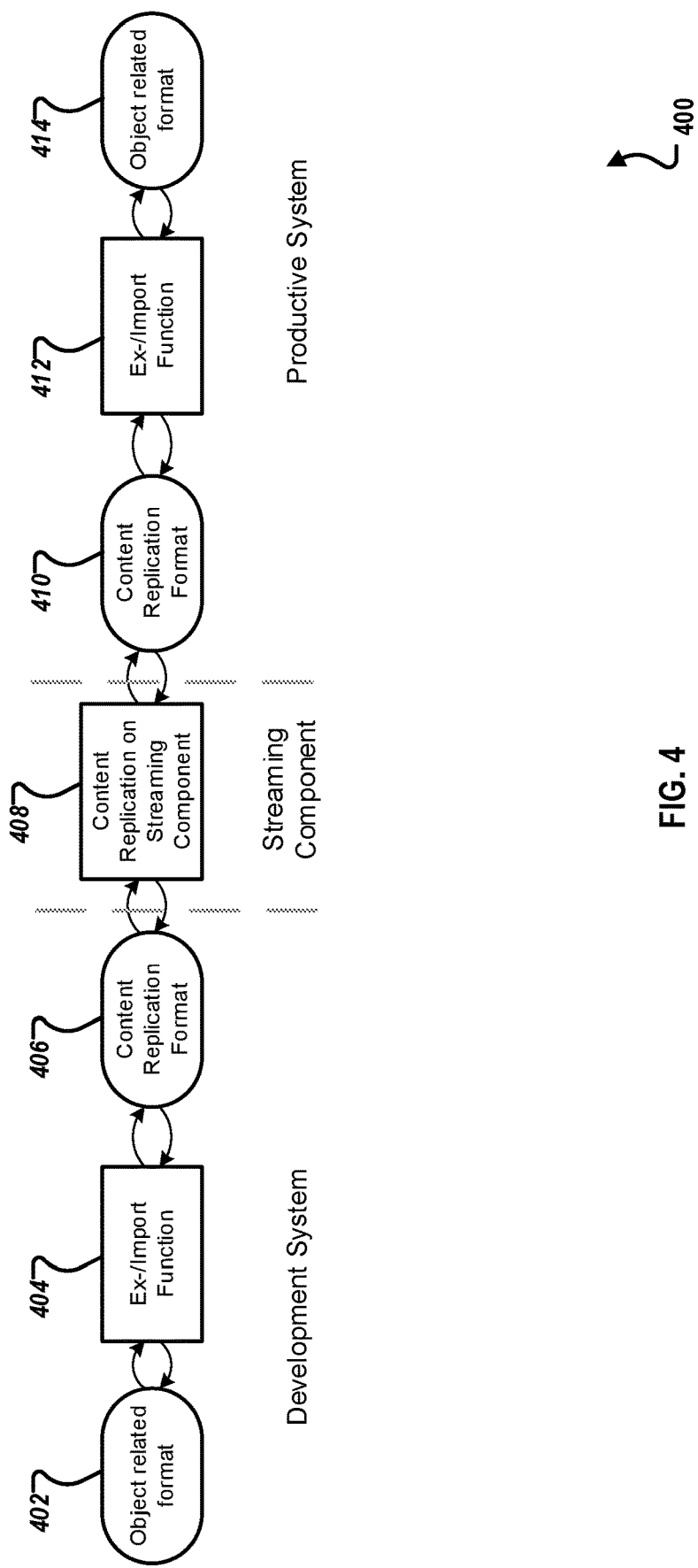
FIG. 4 is a block diagram 400 illustrating a fourth example system of bi-directional content replication for ETD, according to an implementation.

FIG. 4 is a block diagram 400 illustrating a fourth example system 400 of bi-directional content replication for ETD, according to an implementation. The example system 400 shows a technical depiction of operation principles of the described bi-directional content replication. The system 400 includes a development system having object related format 402, ex-/import function 404, and content replication format 406, a productive system having object related format 414, ex-/import function 412, and content replication format 410, and content replication 408 on an SDS. The ex-/import function 404 can convert data between the object related format 402 and the content replication format 406. The object related format 402 can be the data format used in the development system, and the content replication format 406 can be the data format used by the SDS to perform content replication and transport. Similarly, the ex-/import function 412 can convert data between the object related format 414 and the content replication format 410. The object related format 414 can be the data format used in the productive system, and the content replication format 410 can be the data format used by the SDS to perform content replication and transport. For example, the content replication format 406 and 410 can be JAVASCRIPT Object Notation (JSON). In some implementations, a content type implementing software has a certain data format (for example, object related format 402) which is converted to an export format (for example, content replication format 406) and puts the data into an export queue at the development system. From the export queue, the content replication 408 on the SDS transports the data in a transport format (for example, content replication format 410) and puts the data into an import queue at the productive system. From the import queue, the content type implementing software reads the transported data and converts it back to its own data format (for example, object related format 414).

Figure 5:
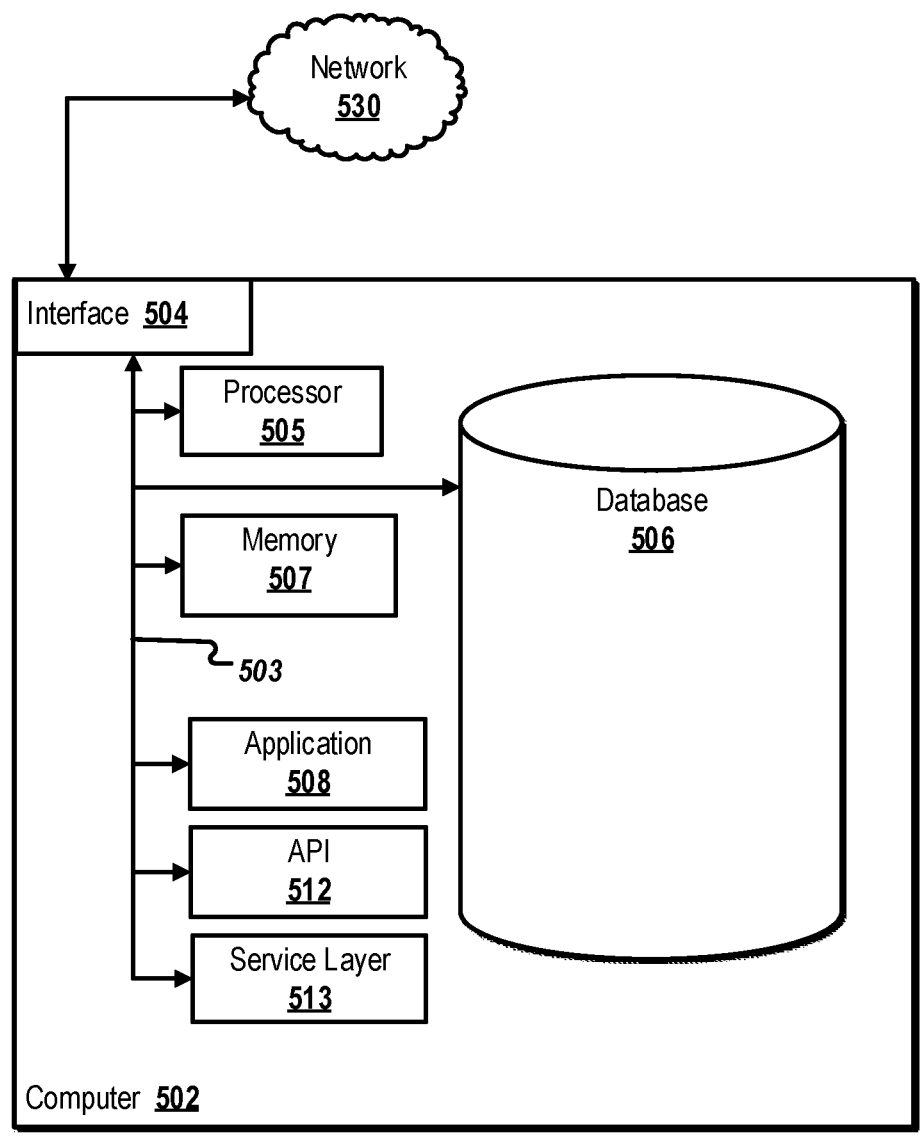
FIG. 5 is a block diagram illustrating an exemplary computer system used to provide computational functionalities associated with described algorithms, methods, functions, processes, flows, and procedures as described in the instant disclosure, according to an implementation.
Figure 5:

FIG. 5 is a block diagram of an exemplary computer system 500 used to provide computational functionalities associated with described algorithms, methods, functions, processes, flows, and procedures as described in the instant disclosure, according to an implementation. The illustrated computer 502 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 502 may comprise a computer that includes an input device, such as a keypad, keyboard, touch screen, or other device that can accept user information, and an output device that conveys information associated with the operation of the computer 502, including digital data, visual, or audio information (or a combination of information), or a graphical user interface (GUI).

The computer 502 can serve in a role as a client, network component, a server, a database or other persistency, or any other component (or a combination of roles) of a computer system for performing the subject matter described in the instant disclosure. The illustrated computer 502 is communicably coupled with a network 530. In some implementations, one or more components of the computer 502 may be configured to operate within environments, including cloud-computing-based, local, global, or other environment (or a combination of environments).

At a high level, the computer 502 is an electronic computing device operable to receive, transmit, process, store, or manage data and information associated with the described subject matter. According to some implementations, the computer 502 may also include or be communicably coupled with an application server, e-mail server, web server, caching server, streaming data server, or other server (or a combination of servers).

The computer 502 can receive requests over network 530 from a client application (for example, executing on another computer 502) and responding to the received requests by processing the said requests in an appropriate software application. In addition, requests may also be sent to the computer 502 from internal users (for example, from a command console or by other appropriate access method), external or third-parties, other automated applications, as well as any other appropriate entities, individuals, systems, or computers.

Each of the components of the computer 502 can communicate using a system bus 503. In some implementations, any or all of the components of the computer 502, both hardware or software (or a combination of hardware and software), may interface with each other or the interface 504 (or a combination of both) over the system bus 503 using an application programming interface (API) 512 or a service layer 513 (or a combination of the API 512 and service layer 513). The API 512 may include specifications for routines, data structures, and object classes. The API 512 may be either computer-language independent or dependent and refer to a complete interface, a single function, or even a set of APIs. The service layer 513 provides software services to the computer 502 or other components (whether or not illustrated) that are communicably coupled to the computer 502. The functionality of the computer 502 may be accessible for all service consumers using this service layer. Software services, such as those provided by the service layer 513, provide reusable, defined functionalities through a defined interface. For example, the interface may be software written in JAVA, C++, or other suitable language providing data in extensible markup language (XML) format or other suitable format. While illustrated as an integrated component of the computer 502, alternative implementations may illustrate the API 512 or the service layer 513 as stand-alone components in relation to other components of the computer 502 or other components (whether or not illustrated) that are communicably coupled to the computer 502. Moreover, any or all parts of the API 512 or the service layer 513 may be implemented as child or sub-modules of another software module, enterprise application, or hardware module without departing from the scope of this disclosure.

The computer 502 includes an interface 504. Although illustrated as a single interface 504 in FIG. 5, two or more interfaces 504 may be used according to particular needs, desires, or particular implementations of the computer 502. The interface 504 is used by the computer 502 for communicating with other systems in a distributed environment that are connected to the network 530 (whether illustrated or not). Generally, the interface 504 comprises logic encoded in software or hardware (or a combination of software and hardware) and operable to communicate with the network 530. More specifically, the interface 504 may comprise software supporting one or more communication protocols associated with communications such that the network 530 or interface's hardware is operable to communicate physical signals within and outside of the illustrated computer 502.

The computer 502 includes a processor 505. Although illustrated as a single processor 505 in FIG. 5, two or more processors may be used according to particular needs, desires, or particular implementations of the computer 502. Generally, the processor 505 executes instructions and manipulates data to perform the operations of the computer 502 and any algorithms, methods, functions, processes, flows, and procedures as described in the instant disclosure.

The computer 502 also includes a database 506 that can hold data for the computer 502 or other components (or a combination of both) that can be connected to the network 530 (whether illustrated or not). For example, database 506 can be an in-memory, conventional, or other type of database storing data consistent with this disclosure. In some implementations, database 506 can be a combination of two or more different database types (for example, a hybrid in-memory and conventional database) according to particular needs, desires, or particular implementations of the computer 502 and the described functionality. Although illustrated as a single database 506 in FIG. 5, two or more databases (of the same or combination of types) can be used according to particular needs, desires, or particular implementations of the computer 502 and the described functionality. While database 506 is illustrated as an integral component of the computer 502, in alternative implementations, database 506 can be external to the computer 502.

The computer 502 also includes a memory 507 that can hold data for the computer 502 or other components (or a combination of both) that can be connected to the network 530 (whether illustrated or not). For example, memory 507 can be random access memory (RAM), read-only memory (ROM), optical, magnetic, and the like storing data consistent with this disclosure. In some implementations, memory 507 can be a combination of two or more different types of memory (for example, a combination of RAM and magnetic storage) according to particular needs, desires, or particular implementations of the computer 502 and the described functionality. Although illustrated as a single memory 507 in FIG. 5, two or more memories 507 (of the same or combination of types) can be used according to particular needs, desires, or particular implementations of the computer 502 and the described functionality. While memory 507 is illustrated as an integral component of the computer 502, in alternative implementations, memory 507 can be external to the computer 502.

The application 508 is an algorithmic software engine providing functionality according to particular needs, desires, or particular implementations of the computer 502, particularly with respect to functionality described in this disclosure. For example, application 508 can serve as one or more components, modules, applications, etc. Further, although illustrated as a single application 508, the application 508 may be implemented as multiple applications 508 on the computer 502. In addition, although illustrated as integral to the computer 502, in alternative implementations, the application 508 can be external to the computer 502.

There may be any number of computers 502 associated with, or external to, a computer system containing computer 502, each computer 502 communicating over network 530. Further, the term "client," "user," and other appropriate terminology may be used interchangeably as appropriate without departing from the scope of this disclosure. Moreover, this disclosure contemplates that many users may use one computer 502, or that one user may use multiple computers 502.

Described implementations of the subject matter can include one or more features, alone or in combination.

For example, in a first implementation, a computer-implemented method comprising: receiving, at a content replication connector and from a source system, control data associated with replication of content data; and based on the control data: fetching the content data from the source system; converting the content data from a first data format to a second data format; and sending the content data to a content replication server, wherein the content replication server replicates the content data, and a target system fetches the content data from the content replication server.

The foregoing and other described implementations can each optionally include one or more of the following features:

A first feature, combinable with any of the following features, wherein the source system is a productive enterprise thread detection system, the target system is a development and test enterprise thread detection system, and the content data is context data of the productive enterprise thread detection system.

A second feature, combinable with any of the previous or following features, wherein the source system is a development and test enterprise thread detection system, the target system is a productive enterprise thread detection system, and the content data is development object.

A third feature, combinable with any of the previous or following features, wherein the data format is JSON.

A fourth feature, combinable with any of the previous or following features, wherein the content replication connector is in a workspace on a smart database streaming server connected to the source system, the workspace having a name including a system identifier of the source system.

A fifth feature, combinable with any of the previous or following features, wherein the content replication server is in a workspace on a smart database streaming server connected to the source system or the target system.

A sixth feature, combinable with any of the previous or following features, wherein receiving the control data from the source system includes polling the source system.

A seventh feature, combinable with any of the previous or following features, wherein the target system is connected to a second content replication connector, the second content replication connector receives the control data from the target system, and based on the control data the second content replication connector fetches the content data from the content replication server.

An eighth feature, combinable with any of the previous or following features, wherein the second content replication connector further converts the content data from the second data format to the first data format, and sends the content data to the target system.

In a second implementation, a non-transitory, computer-readable medium storing one or more instructions executable by a computer system to perform operations comprising: receiving, at a content replication connector and from a source system, control data associated with replication of content data; and based on the control data: fetching the content data from the source system; converting the content data from a first data format to a second data format; and sending the content data to a content replication server, wherein the content replication server replicates the content data, and a target system fetches the content data from the content replication server.

The foregoing and other described implementations can each optionally include one or more of the following features:

A first feature, combinable with any of the following features, wherein the source system is a productive enterprise thread detection system, the target system is a development and test enterprise thread detection system, and the content data is context data of the productive enterprise thread detection system.

A second feature, combinable with any of the previous or following features, wherein the source system is a development and test enterprise thread detection system, the target system is a productive enterprise thread detection system, and the content data is development object.

A third feature, combinable with any of the previous or following features, wherein the data format is JSON.

A fourth feature, combinable with any of the previous or following features, wherein the content replication connector is in a workspace on a smart database streaming server connected to the source system, the workspace having a name including a system identifier of the source system.

A fifth feature, combinable with any of the previous or following features, wherein the content replication server is in a workspace on a smart database streaming server connected to the source system or the target system.

A sixth feature, combinable with any of the previous or following features, wherein the target system is connected to a second content replication connector, the second content replication connector receives the control data from the target system, and based on the control data the second content replication connector fetches the content data from the content replication server.

A seventh feature, combinable with any of the previous or following features, wherein the second content replication connector further converts the content data from the second data format to the first data format, and sends the content data to the target system.

In a third implementation, a computer-implemented system comprising a computer memory; and a hardware processor interoperably coupled with the computer memory and configured to perform operations comprising: receiving, at a content replication connector and from a source system, control data associated with replication of content data; and based on the control data: fetching the content data from the source system; converting the content data from a first data format to a second data format; and sending the content data to a content replication server, wherein the content replication server replicates the content data, and a target system fetches the content data from the content replication server.

The foregoing and other described implementations can each optionally include one or more of the following features:

A first feature, combinable with any of the previous or following features, wherein the target system is connected to a second content replication connector, wherein the second content replication connector receives the control data from the target system, and based on the control data the second content replication connector fetches the content data from the content replication server.

A second feature, combinable with any of the previous or following features, wherein the second content replication connector further converts the content data from the second data format to the first data format, and sends the content data to the target system.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., less than 5 secs., etc. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate. Thresholds used to make computational determinations can be statically, dynamically, or both statically and dynamically determined.

The methods, processes, logic flows, etc. described in this specification can be performed by one or more programmable computers executing one or more computer programs to perform functions by operating on input data and generating output. The methods, processes, logic flows, etc. can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/–R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
    connecting a content replication server to a first content replication connector and a second content replication connector, the first content replication connector and the second content replication connector each comprising an import module, an export module, and a read content replication content module, the content replication server comprising a reactive component connectable to a plurality of systems being unaware of a total number of the plurality of systems;
    connecting a source system to the content replication server through the first content replication connector;
    connecting a target system to the content replication server through the second content replication connector;
    receiving, by the read content replication content module of the first content replication connector and from the source system, control data associated with replication of content data, wherein the control data indicates the source system and the target system; and based on the control data:
    fetching, by the import module of the first content replication connector, the content data from the source system;
    converting, by the import module of the first content replication connector, the content data from a first data format to a second data format; and
    sending, by the export module of the first content replication connector, the content data to the content replication server, wherein the content replication server replicates the content data, and the target system fetches the content data from the content replication server through the second content replication connector.

2. The computer-implemented method of claim 1, wherein the source system is a productive enterprise threat detection system, the target system is a development and test enterprise threat detection system, and the content data is context data of the productive enterprise threat detection system.

3. The computer-implemented method of claim 1, wherein the source system is a development and test enterprise threat detection system, the target system is a productive enterprise threat detection system, and the content data includes one or more development objects.

4. The computer-implemented method of claim 1, wherein the second data format is JAVASCRIPT Object Notation (JSON).

5. The computer-implemented method of claim 1, wherein the first content replication connector is in a workspace on a smart database streaming server connected to the source system, the workspace having a name including a system identifier of the source system.

6. The computer-implemented method of claim 1, wherein the content replication server is in a workspace on a smart database streaming server connected to the source system or the target system.

7. The computer-implemented method of claim 1, wherein receiving the control data from the source system includes polling the source system.

8. The computer-implemented method of claim 1, wherein the target system is connected to the second content replication connector, wherein the second content replication connector receives the control data from the target system, and based on the control data the second content replication connector fetches the content data from the content replication server.

9. The computer-implemented method of claim 8, wherein the second content replication connector further converts the content data from the second data format to the first data format, and sends the content data to the target system.

10. A non-transitory, computer-readable medium storing one or more instructions executable by a computer system to perform operations comprising:
    connecting a content replication server to a first content replication connector and a second content replication connector, the first content replication connector and the second content replication connector each comprising an import module, an export module, and a read content replication content module, the content replication server comprising a reactive component connectable to a plurality of systems being unaware of a total number of the plurality of systems;
    connecting a source system to the content replication server through the first content replication connector;
    connecting a target system to the content replication server through the second content replication connector;
    receiving, by the read content replication content module of the first content replication connector and from the source system, control data associated with replication of content data, wherein the control data indicates the source system and the target system; and
    based on the control data:
        fetching, by the import module of the first content replication connector, the content data from the source system;
        converting, by the import module of the first content replication connector, the content data from a first data format to a second data format; and
        sending, by the export module of the first content replication connector, the content data to the content replication server, wherein the content replication server replicates the content data, and the target system fetches the content data from the content replication server through the second content replication connector.

11. The non-transitory, computer-readable medium of claim 10, wherein the source system is a productive enterprise threat detection system, the target system is a development and test enterprise threat detection system, and the content data is context data of the productive enterprise threat detection system.

12. The non-transitory, computer-readable medium of claim 10, wherein the source system is a development and test enterprise threat detection system, the target system is a productive enterprise threat detection system, and the content data includes one or more development objects.

13. The non-transitory, computer-readable medium of claim 10, wherein the second data format is JAVASCRIPT Object Notation (JSON).

14. The non-transitory, computer-readable medium of claim 10, wherein the first content replication connector is in a workspace on a smart database streaming server connected to the source system, the workspace having a name including a system identifier of the source system.

15. The non-transitory, computer-readable medium of claim 10, wherein the content replication server is in a workspace on a smart database streaming server connected to the source system or the target system.

16. The non-transitory, computer-readable medium of claim 10, wherein the target system is connected to the second content replication connector, wherein the second content replication connector receives the control data from the target system, and based on the control data the second content replication connector fetches the content data from the content replication server.

17. The non-transitory, computer-readable medium of claim 16, wherein the second content replication connector further converts the content data from the second data format to the first data format, and sends the content data to the target system.

18. A computer-implemented system, comprising:
    a computer memory; and
    a hardware processor interoperably coupled with the computer memory and configured to perform operations comprising:
        connecting a content replication server to a first content replication connector and a second content replication connector, the first content replication connector and the second content replication connector each comprising an import module, an export module, and a read content replication content module, the content replication server comprising a reactive component connectable to a plurality of systems being unaware of a total number of the plurality of systems, connecting a source system to the content replication server through the first content replication connector, connecting a target system to the content replication server through the second content replication connector, receiving, by the read content replication content module of the first content replication connector and from the source system, control data associated with replication of content data, wherein the control data indicates the source system and the target system, and based on the control data:
fetching, by the import module of the first content replication connector, the content data from the source system, converting, by the import module of the first content replication connector, the content data from a first data format to a second data format, and sending, by the export module of the first content replication connector, the content data to the content replication server, wherein the content replication server replicates the content data, and the target system fetches the content data from the content replication server through the second content replication connector.

19. The computer-implemented system of claim 18, wherein the target system is connected to a second content replication connector, wherein the second content replication connector receives the control data from the target system, and based on the control data the second content replication connector fetches the content data from the content replication server.

20. The computer-implemented system of claim 19, wherein the second content replication connector further converts the content data from the second data format to the first data format, and sends the content data to the target system.

* * * * *